United States Patent
Sharma et al.

(10) Patent No.: US 12,096,514 B2
(45) Date of Patent: Sep. 17, 2024

(54) NETWORK SLICE CONFIGURATION

(71) Applicant: Telefonaktiebolaget LM Ericsson (publ), Stockholm (SE)

(72) Inventors: Nipun Sharma, New Delhi (IN); Rakesh Bajpai, New Delhi (IN); Steve Menear, Hiram, GA (US); Tushar Sabharwal, New Delhi (IN); Hans Eriksson, Sollentuna (SE); Rajiv Bhardwaj, Jalandhar (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 339 days.

(21) Appl. No.: 17/441,121

(22) PCT Filed: Mar. 22, 2019

(86) PCT No.: PCT/EP2019/057294
§ 371 (c)(1),
(2) Date: Sep. 20, 2021

(87) PCT Pub. No.: WO2020/192871
PCT Pub. Date: Oct. 1, 2020

(65) Prior Publication Data
US 2022/0167145 A1  May 26, 2022

(51) Int. Cl.
*H04W 8/14* (2009.01)
*H04L 67/02* (2022.01)
*H04L 67/51* (2022.01)

(52) U.S. Cl.
CPC ............. *H04W 8/14* (2013.01); *H04L 67/02* (2013.01); *H04L 67/51* (2022.05)

(58) Field of Classification Search
CPC ......... H04W 8/14; H04W 8/18; H04W 48/18; H04L 67/02; H04L 67/34; H04L 67/51; H04L 67/56; H04L 61/4511
See application file for complete search history.

(56) References Cited

U.S. PATENT DOCUMENTS

2007/0199049 A1* 8/2007 Ziebell .................... H04L 63/10
726/3
2017/0344703 A1* 11/2017 Ansari ............... H04L 12/2898
(Continued)

FOREIGN PATENT DOCUMENTS

EP 2403226 A1 * 1/2012 ............ H04L 12/66
EP 3404966 A1 11/2018
(Continued)

OTHER PUBLICATIONS

International Search Report and Written Opinion dated May 15, 2019 for International Application No. PCT/ EP2019/057294 filed Mar. 22, 2019, consisting of 10-pages.
(Continued)

*Primary Examiner* — Siu M Lee
(74) *Attorney, Agent, or Firm* — Weisberg I.P. Law, P.A.

(57) ABSTRACT

Methods and apparatus are provided for network slice configuration. In one example aspect, a method in a network function in a network is disclosed. The network is a visited network for at least one User Equipment, UE. The network provides a network slice for the at least one UE, and the network function is a gateway for data communications for the at least one UE. The method includes obtaining an IP address for at least one service for the at least one UE, and providing the at least one service to the at least one UE according to a gateway configuration from a home network of the at least one UE.

19 Claims, 5 Drawing Sheets

(56) References Cited

U.S. PATENT DOCUMENTS

2019/0020996 A1    1/2019  Zhang et al.
2020/0015158 A1*   1/2020  So ......................... H04W 48/18
2021/0409931 A1*  12/2021  Arkko ................. H04L 41/5054

FOREIGN PATENT DOCUMENTS

WO    2013049587  A2    4/2013
WO    2018061803  A1    4/2018
WO    2019053682  A1    3/2019

OTHER PUBLICATIONS

European Search Report dated Oct. 5, 2023 for Application No. 19713018.0, consisting of 7 pages.

* cited by examiner

NETWORK SLICE CONFIGURATION

CROSS-REFERENCE TO RELATED APPLICATIONS

This application is a Submission Under 35 U.S.C. § 371 for U.S. National Stage Patent Application of International Application Number: PCT/EP2019/057294, filed Mar. 22, 2019 entitled "NETWORK SLICE CONFIGURATION," the entirety of which is incorporated herein by reference.

TECHNICAL FIELD

Examples of the present disclosure relate to network slice configuration, for example in a visited network for a User Equipment (UE).

BACKGROUND

Network slicing allows multiple logical networks to be created on top of a common shared physical infrastructure. For example, in the 5G architecture, network slicing is defined as set of network functions, and resources to run these network functions, forming a complete instantiated logical network to meet certain network characteristics required by the Service Instance(s).

In a home network of a User Equipment (UE) or subscriber, the PLMN operator may manage and orchestrate network slicing operations for the 5G subscribers. These slicing operations may include design, instantiation, operation and decommissioning of network slices for 5G subscribers.

For 5G roaming subscribers, that is, 5G subscribers accessing a visited network, there may be two primary mechanisms for control plane signaling: home routed and local breakout. In the home routed mechanism, the roaming subscriber user plane is routed back to the home PLMN (HPLMN) for the subscribers, which is controlled and administered by the operator of the HPLMN. In the local breakout mechanism, the operator of the visited PLMN (VPLMN) or visited network has control of the roaming subscribers' signaling.

In federated slicing, a home network operator sets up a part/subnet of the network slice using infrastructure provided by a partner network operator to extend the home network services into areas served by the partner network operators. The home network operator has the responsibility to manage the network slice provided by the partner network. Specification of the parameters of the federated slice by the home network operator may allow subscribers roaming in the visited partner network to be provided with particular network functions and/or quality of service.

SUMMARY

One aspect of the present disclosure provides a method in a network function in a network. The network is a visited network for at least one User Equipment, UE. The network provides a network slice for the at least one UE, and the network function is a gateway for data communications for the at least one UE. The method comprises obtaining an IP address for at least one service for the at least one UE, and providing the at least one service to the at least one UE according to a gateway configuration from a home network of the at least one UE.

Another aspect of the present disclosure provides a method in a home network for at least one User Equipment, UE. The method comprises instantiating a network slice for the at least one UE in a visited network for the at least one UE, and providing a gateway configuration for the network slice to the visited network, the gateway configuration for configuring a network function in the visited network to provide at least one service to the at least one UE.

A further aspect of the present disclosure provides apparatus in a network. The network is a visited network for at least one User Equipment, UE. The network provides a network slice for the at least one UE, and the apparatus implements a gateway for data communications for the at least one UE. The apparatus comprises a processor and a memory. The memory contains instructions executable by the processor such that the apparatus is operable to obtain an IP address for at least one service for the at least one UE, and provide the at least one service to the at least one UE according to a gateway configuration from a home network of the at least one UE.

Another aspect of the present disclosure provides apparatus in a home network for at least one User Equipment, UE. The apparatus comprises a processor and a memory. The memory contains instructions executable by the processor such that the apparatus is operable to instantiate a network slice for the at least one UE in a visited network for the at least one UE, and provide a gateway configuration for the network slice to the visited network, the gateway configuration for configuring a network function in the visited network to provide at least one service to the at least one UE.

A still further aspect of the present disclosure provides apparatus in a network. The network is a visited network for at least one User Equipment, UE. The network provides a network slice for the at least one UE, and the apparatus implements a gateway for data communications for the at least one UE. The apparatus is configured to obtain an IP address for at least one service for the at least one UE, and provide the at least one service to the at least one UE according to a gateway configuration from a home network of the at least one UE.

Another aspect of the present disclosure provides apparatus in a home network for at least one User Equipment, UE. The apparatus is configured to instantiate a network slice for the at least one UE in a visited network for the at least one UE, and provide a gateway configuration for the network slice to the visited network, the gateway configuration for configuring a network function in the visited network to provide at least one service to the at least one UE.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
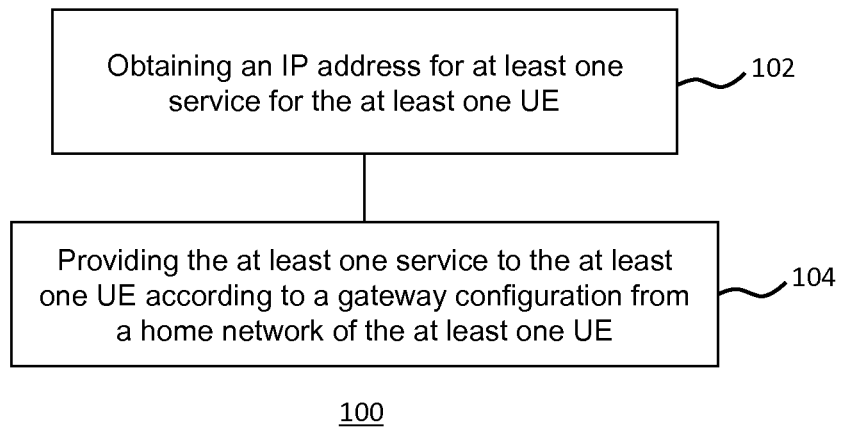
FIG. 1 is a flow chart of an example of a method in a network function in a network.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In a home routed network slice, this mechanism comes with the drawback of considerable latency issues as a UE's traffic is routed via the UE's home network. Alternatively, in a network slice with local breakout, the home network has no control of the service provided to the UE, and it may be difficult to make the UE's experience consistent across networks.

In a federated slice using local breakout, the user is connected via a Packet Data Network (PDN) gateway (GW), PGW, in the visited network, and traffic is transported between the UE and the PDN without traversing a PDN GW in the home network. To support quality of service via the visited network's PGW, the home network Policy and Charging Rules Function (PCRF) may interact with the visited network PCRF for setting appropriate policy functions via a S9 reference point.

In local breakout scenario, the home network has limited control over the visited network's PGW configuration and limited information is passed back to the home network regarding the UE's voice and data usage. In an example, in a PGW owned and managed by a visited network, functionality such as for example per-user based packet filtering, deep packet inspection, traffic steering is not possible for local breakout. The home network may wish to provide a subscriber or UE with a particular benefit, such as for example a predetermined amount of data usage while using certain services or visiting particular websites. The visited network will need to use the home routed mechanism, as local breakout may not technically support the requirements. For example, the PGW in the visited network might not be configured for packet filtering based on particular services or websites.

Additionally, the IP address attached to a particular service, URL or application in a specific visited network may be different from that in the home network. For example, the IP address or addresses associated with a service may vary between different regions or countries. The IP address or addresses for a particular service, URL or application may be managed by the visited network with no control by a home network. Therefore, the home network, even though traffic is directed through the home network's PGW, may not be able to determine that traffic related to a particular service (e.g. application, website) should be treated in a particular way, because an IP address related to the traffic is unknown to the home network, e.g. when configuring the PGW. Additionally, an application server (AS) may return an HTTP Redirect request to a UE, and direct it to a different IP address, which may also be unknown to the home network. These problems may increase with larger numbers of countries and operators.

In some embodiments of the present disclosure, a network function (e.g. a virtual network function, VNF) that is deployed in a network slice includes a function to resolve an IP address for a service. That is, for example, the network function may include a URI or URL to IP address resolution function. Thus for example the network function may automatically be able to obtain the IP address for services accessed by one or more UEs connected to a network slice.

Some embodiments provide a method to configure a home network (e.g. HPLMN) managed gateway or PGW on a slice such as a federated slice. The configuration (or the gateway or PGW) may be created as part of instantiation of a slice or a virtual network function (VNF). For example, charging bundles, subscription parameters and/or offers may be activated at the gateway in the visited network for roaming subscribers in a local breakout scenario. The configuration may in some examples be specific to a certain visited network, region and/or country.

During instantiation, a particular configuration for the gateway in the visited network (e.g. VPLMN) can be chosen based on one or more of the visited network country and/or operator, the particular parameters of the configuration (e.g. specifying the particular service to which a rule such as a data allowance might apply), and/or a subscriber category (e.g. based on IMSI or MSISDN). In some examples, during slice creation or instantiation, configuration modules may be included (e.g. provided by the home network). These configuration modules may be chosen based for example on the criteria mentioned above. As a result, a slice may be created with a configuration that may not replicate the complete configuration from the home network, as not all of the configuration may be needed or relevant to the particular visited network or slice. This may save resources on the slice, as for example extra deep packet inspection (DPI) configuration may be resource intensive and may lead to higher operating expenditure.

In some examples, a configuration of a gateway requires classifying or processing relevant traffic according to configured rules. Therefore, in some examples, the configuration may specify one or more rules to apply to traffic, e.g. in relation to a service and/or a subscriber or group of subscribers. These rules can be, for example, layer 3/4 shallow packet inspection (SPI) rules; layer 7 deep packet inspection (DPI) rules; and/or heuristic rules, e.g. pattern matching based on historical data.

FIG. 1 is a flow chart of an example of a method 100 in a network function in a network. The network is a visited network for at least one User Equipment, UE. That is, for example, the UE is roaming at the visited network. The network provides a network slice (which may in some examples be a federated network slice) for the at least one UE, and thus for example the UE(s) may be connected to (or may connect to) the visited network. The network function may be a gateway for data communications for the at least one UE, for example while the UE(s) is/are connected to the network slice, or is/are roaming at the visited network or the network slice. In some examples, the network function may be a packet gateway or PDN gateway (PGW). In some examples, the gateway configuration may be obtained or received from the home network, for example in response to instantiation of the network slice. The visited network may comprise for example a Visited Public Land Mobile Network, VPLMN, for the at least one UE, and the home network may comprise for example a Home Public Land Mobile Network, HPLMN, for the at least one UE.

The method 100 comprises, in step 102, obtaining an IP address for at least one service for the at least one UE. This may be done for example in response to the at least one UE attempting to access the service, which may be for example a website, URL, URI, application or the like. The UE may be a mobile device. The method 100 then comprises, in step 104, providing the at least one service to the at least one UE according to a gateway configuration from a home network of the at least one UE.

For example, the gateway configuration may indicate how a service may be provided to the UE. The service may be provided via a PGW of the visited network or network slice, and hence in some examples at least part of the gateway configuration may configure the PGW of the visited network or network slice. The gateway configuration may identify for example at least one billing rule, at least one data access rule and/or at least one Shallow Packet Inspection (SPI) rule for the at least one service and/or for the at least one UE. For example, the gateway configuration may indicate any rule that should be followed when providing the service to the at least one UE or allowing the at least one UE to access the service. These rules may include, for example, one or more of charging or billing rules for a particular service (e.g. whether use of the service should be charged or taken from the data allowance associated with a UE or a subscriber using the UE), data access rules (e.g. bandwidth, quality of service, or other data access property), charging, billing or data access rules associated with a particular UE or subscriber or group of UEs or subscribers, and/or any other suitable property that may define how the service is accessed by the at least one UE and/or how usage will be treated by the home network in terms of billing and/or data allowances. Rules may be specific to services, or to one or more particular UEs, or both. Thus, for example, the gateway configuration comprises at least one rule associated with the at least one UE, and/or at least one rule associated with the at least one service.

As a result of the gateway configuration, the service may be provided to the UE in a particular way, and the UE may enjoy a particular experience using the service. The service may be accessed through for example the PGW of the visited network or network slice in a manner similar to "local breakout," while the home network may have control over the access of the service by the UE by virtue of the gateway configuration.

In some examples, providing the at least one service to the at least one UE comprises processing data communications for the at least one UE according to the gateway configuration. For example, the data communications may be processed through a PGW of the visited network or network slice. In some examples, the data communications may include voice communications transmitted as data such as voice over IP (Vol P).

In some examples, the at least one service may be identified in the gateway configuration by one or more Uniform Resource Identifiers, URIs. For example, the gateway configuration may identify one or more URIs (e.g. one or more URLs) and one or more rules to apply when the at least one UE is using the service by accessing the URIs. In some examples, obtaining an IP address for the at least one service in step 102 of the method 100 may comprise or include performing a Domain Name System, DNS, query using the one or more URIs. Thus, for example, the rules may then be applied to access of the service at the IP address by the at least one UE. In this way, in some examples, the home network may maintain control of access of the service, even if it does not know the particular IP address to which the URI of the service resolves at the visited network or network slice.

The network function may include a Traffic Detection Function, TDF, to apply one or more rules of the gateway configuration, such as for example shallow packet inspection (SPI) rules. The network function can be deployed with or without TDF capabilities.

In some examples, the network function (e.g. PGW) is comprised in the network slice. In other examples, the network function may be also used by one or more other network slices and/or the visited network.

In some examples, providing the at least one service to the at least one UE comprises selectively allowing a HTTP redirect request for the at least one service based on the gateway configuration. For example, the gateway configuration may include one or more rules that indicate whether HTTP redirects should be allowed (or denied) for one or more particular URLs.

In some examples, the gateway configuration is specific to the visited network. That is, for example, the gateway configuration may be applied to the visited network, or the network slice in the visited network, and not to any other network or network slice. Alternatively, in other examples, the gateway configuration may be also be applicable to network slices in other networks. For example, the gateway configuration may be applicable to any instance of the network slice in any network (e.g. any network slice that offers a particular virtual network or MVNO to one or more UEs).

In some examples, the gateway configuration may be changed, for example by adding, removing or changing one or more rules in the gateway configuration. The method 100 therefore comprises in some examples receiving an update to the gateway configuration. The update may, for example, be received from the home network of the at least one UE. The update to the gateway configuration may identify the at least one service, if the part of the gateway configuration associated with the service is to be changed or removed.

Additionally or alternatively, the update may identify at least one further service that is to be added to the gateway configuration. The update may in some examples specify the rules that are to be applied to the service (or the further service), or changes that are to be made to the rules.

Figure 2:
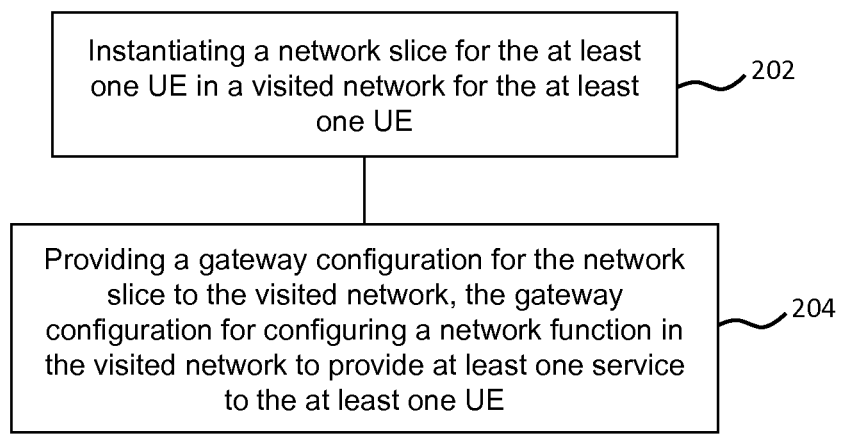
FIG. 2 is a flow chart of a method in a home network for at least one User Equipment.

FIG. 2 is a flow chart of a method 200 in a home network for at least one User Equipment, UE. That is, for example, the home network is the home network for the UE. The method 200 may be carried out in some examples by any suitable network node in the home network or associated with the home network. The method comprises, in step 202, instantiating a network slice for the at least one UE in a visited network for the at least one UE. For example, an instruction may be sent by the home network to create or instantiate the network slice in the visited network. The method 200 also comprises, in step 204, providing (e.g. sending) a gateway configuration for the network slice to the visited network, the gateway configuration for configuring a network function in the visited network to provide at least one service to the at least one UE. The network function may be for example a packet gateway or PGW. In some examples, a network function in the visited network may then carry out the method 100 described above.

In some examples, the gateway configuration is to configure the network function to process data communications for the at least one UE according to the gateway configuration. Thus for example the home network may control the processing of the data communications, even in a local breakout scenario where the data communications are routed for example through a gateway of the visited network and not via the home network.

In some examples, the method 200 also comprises sending an update to the gateway configuration to the visited network. The update to the gateway configuration may identify the at least one service and/or at least one further service.

Particular example embodiments will now be described. With local breakout for a slice such as a federated slice, for example, over-the-top (OTT) content-based bundles can be offered to roaming subscribers, e.g. those subscribers or UEs visiting a network other than their home network. In current networks, such offers are restricted due to the limitations of visited network PGW as outlined above. This can be alleviated by configuration of a gateway in a visited network with a configuration, including for example SPI, DPI and/or heuristics rules. As earlier established, these rules may in some examples cause degradation in the gateway capacity or performance. To limit such degradation, in some examples, a complete configuration of a gateway is not replicated in every visited network slice (e.g. each instantiation of a visited federated slice). Instead, in some examples, the configuration may include a subset of complete rules, such as for example one or more configuration modules suggested above, and traffic classification relevant to the roaming bundles and/or subscribers in specific visited networks (e.g. VPLMNs) may be included in examples of such cases.

To initiate the configuration of a gateway (e.g. PGW), a node such as for example a Business Support System (BSS) may trigger a virtual network function (VNF) lifecycle management (LCM) or orchestrator node. It may provide an indication of what kind of offer or service is being offered. Here it is referred to as an Offer-Id.

Example embodiments provide configuration modules to be prepared for different services (e.g. OTT content bundles). Thus, for example, configuration modules for a gateway may be prepared that relate to offers (or services) already provided in the home network. This can also be done for new offers or services for roaming subscribers which are not available to subscribers in the home network. For example, for an offer or service, relevant SPI, DPI and/or heuristic rules may be created as a configuration module which can be included as a configuration for a gateway in one or multiple federated slice deployments.

When using "Offer-Id" when roaming, there is a requirement on how to configure the correct rules (e.g. SPI filtering rules) for a service. The configuration of the rules may be done from the home network in some examples, but configurations may be different depending on the country the subscribers are roaming into and/or depending on services (e.g. OTT application), service implementation and/or deployment strategies used.

Some embodiments of this disclosure provide an external (that is, not in the home network/HPLMN) Service Discovery Function to resolve URIs or URLs to IP addresses for a service. In some examples, the service or the IP address may be is located locally to the visited network in which a subscriber is accessing the service, such as for example in the country where the subscriber is accessing the service (e.g. the country of the visited network). This external (to the home network) Service Discovery Function may in some basic embodiments be a DNS server which resolves URIs, URLs and/or domain names to IP addresses. This function may in some examples be located in the visited network itself or may be part of an external network.

In some examples, such as for example in an edge deployment scenario, using a traffic detection function (TDF) configured from an application server or a home network, a node such as an orchestrator (e.g. V-NWS LCM) may retrieve URIs (e.g. URLs) from an application. The application could be for example a visited network application, home network application deployed as part of the network slice, or an OTT application deployed in the edge but in a separate server. The orchestrator may have a list of URIs or URLs referring to allowed services (e.g. defined in BSS), plus a list of HTTP redirect addresses known by the application. Those URIs or URLs may then be translated to IP addresses (e.g. that may belong to different IP domains depending on where the application servers are deployed). In the edge deployment scenario, applications using HTTP redirect may redirect to another address (e.g. in edge site, in the operator's primary site, or servers located on the Internet). Some embodiments, a redirect to another address, such as for example HTTP redirect, may be allowed or disallowed for a service and/or for a subscriber. For example, a configuration or configuration module, such as for example associated with an Offer-Id, may be used to indicate whether HTTP redirect is allowed or not allowed as part of the service agreement for the service related to the Offer-Id.

In some examples, an orchestrator may device based on one or more criteria (e.g. visited network country or operator, offer type, subscriber category) which configuration module(s) are chosen for different federated slices. Thus, in some examples, not all configuration modules (and thus is not the entire configuration) may be replicated in all federated slices. This may ensure improved or optimal use of resources in federated slices. Example criteria are detailed below.

Visited network country or operator: Different services or offers may be selected based on the country of the visited network. For example, particular services (e.g. applications and/or web sites) may be used more in certain countries. Therefore, this information can be considered while selecting the configuration modules to be provided for the network slice. For example, if the slice is to be deployed on a network in a country in which a certain service is extensively used by subscribers in that country, an associated configuration module may be selected for that slice and used to configure a gateway for that slice.

OTT specific bundles: Different OTT specific bundles can be offered to roaming subscribers, which relate to for example different services such as applications and/or web sites. These bundles may be based on popular applications within the home network. Such offers may for example include the usage of a service for a pre-defined amount of data at discounted rates, or a certain amount of usage for which there will be no charge.

Subscriber Category: Different subscribers may be offered different bundles. These subscriber categories are differentiated in P-GW either by static parameters like IMSI, MSISDN and CC or this can be done dynamically with PCRF.

In some embodiments, a configuration may be provided to configure a gateway in a slice (e.g. such that the gateway may provide a service to a UE according to the gateway configuration) in a visited network in two example scenarios: when the gateway is instantiated for the first time in a slice, or when new bundles are introduced and an already deployed or instantiated gateway is to be updated.

In an example of the first scenario, when a gateway is instantiated for the first time in a slice (which may also in some examples be during instantiation of the slice itself), the gateway configuration is provided, for example from the home network. The gateway in the slice in a visited network may for example be instantiated with only relevant bundle configuration related to the slice in the visited network, according to the gateway configuration. Once an offer is prepared in BSS, e.g. a bundle for certain web sites and/or services, this information is triggered towards a lifecycle management (LCM) function and a relevant Offer-Id (or multiple identifications) is provided so that correct configuration module for the gateway is chosen. This Offer-id may be chosen by a BSS to reflect the selection criteria outlined above. Based on the Offer-Id, the LCM chooses the correct configuration module and that configuration is implemented in the gateway in the slice or the visited network immediately after deployment. This configuration can also be included as part of an initial configuration which is used during the deployment itself.

Figure 3:
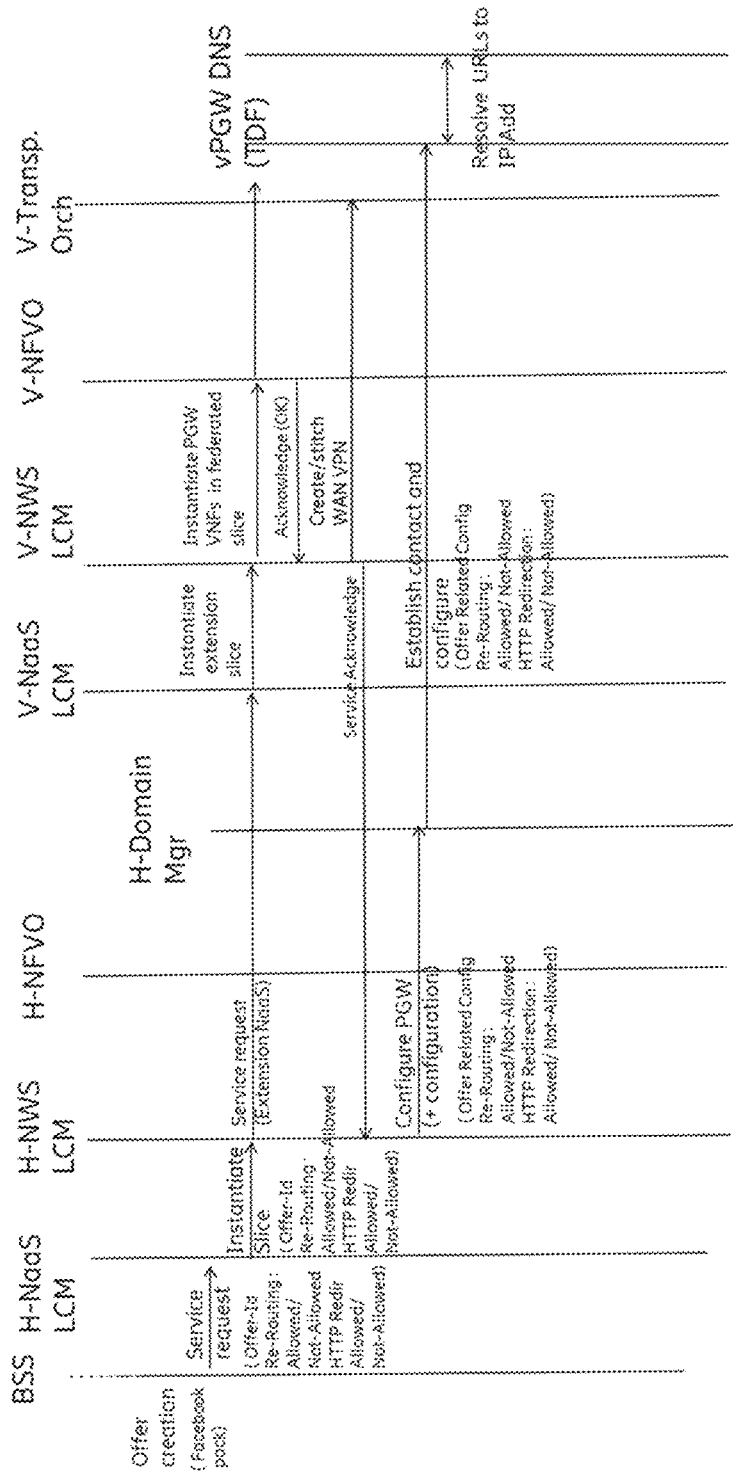
FIG. 3 shows an example of a call flow in a scenario where a gateway is instantiated for the first time in a slice.

FIG. 3 shows an example of a call flow 300 in this scenario, where a gateway is instantiated for the first time in a slice. Steps of the call flow this example scenario are described in more detail below.

1. BSS requests a NaaS based on a service e.g. offer or bundle to e.g. home network NaaS (H-NaaS) lifecycle manager (LCM). This may be for example an "offer" available in a service catalogue and made orderable. The customer may provide some input and/or customer specific data needed during the instantiation (e.g. region of service, number of end user devices, capacity demand). This includes at least one Offer-Id as (one of) the features to identify the correct configuration module for the gateway in the slice or visited network.
2. Based on the definition of the requested offer, the NaaS governance maps this to network slice(s). As an example, the offer may say that a new slice shall be instantiated. It may also specify some of the input parameters required at the network slice governance layer (e.g. defined by a blueprint) or how to derive these parameters e.g. based on customer data, service level agreement (SLA) data etc.
3. A request is sent downwards to the network slice LCM (Life Cycle Manager) (H-NWS LCM) to instantiate a slice, pointing at a named blueprint and providing the required input parameters specific to the gateway in the slice. This includes at least one Offer-Id as one of the features to identify the correct configuration module for the gateway.
4. The network slice LCM parses the blueprint and executes a workflow for instantiation. Resource needs are determined, e.g. based on blueprint and inputs, such as "size" of network functions instances, and a configuration is generated for each VNF (or management instance) based on blueprint, input parameters and back-end services (some properties may need to be assigned and/or unique, such as IP addresses or certain identifiers). Based on the Offer-Id(s) correct configuration module(s) for the gateway is/are chosen.
5. The network slice LCM may request infrastructure resource shares from transport, access and cloud domains (e.g. separate pools of resources or some level of priority).
6. In the case that the NaaS request covers agreement to have a federated slice (e.g. coverage is larger than the home network), the home network NWS-LCM may request an Extension slice from the visited network NaaS-LCM.
7. A request is sent downwards to the visited network slice LCM to instantiate an extension slice, pointing at an extension slice blueprint and providing the required input parameters.
8. The visited network slice LCM may choose the required gateway configuration based on the above listed criteria and/or one or more other criteria. This initial configuration may in some examples include the offer module for the bundle related configuration.
9. The visited network slice LCM requests the visited network NFVO (V-NFVO) to instantiate individual VNFs (including at least one gateway) according to the blueprint of the extension slice.
10. When VNF instantiation is completed, the WAN to VPN sticking is done between the home and visited networks. The VNFs (e.g. gateway) in the extension slice may be connected to the home network and management functions.
11. The newly created VNFs (e.g. gateway) is connected to the visited network's RAN through a reconfiguration, initiated by the visited network NWS (V-NWS) LCM, of visited networks dedicated slice used for federation of network slices.
12. The V-NWS LCM sends an acknowledgement back to NaaS LCM that returns a network slice service creation acknowledgement back to the home network NWS (H-NWS) LCM.
13. Post-install, the home network slice LCM (H-NWS LCM) may interact directly with VNFs (the gateway) and/or intra-slice management functions to fully configure the network slice, by contacting the home network domain manager (H-Domain Mgr). This may include the offer specific configuration. This initial configuration may in some examples include the offer module for the bundle related configuration.
14. A list of URIs or URLs is provided to the gateway as part of Offer-Id configuration.
15. The gateway may then retrieve the local IP addresses (local to the visited network) using an External Service Discovery Function, such as for example a DNS lookup on these URIs or URLs. Thus, for each federated slice, the same list of URLs may result in different IP addresses for configuration rules (e.g. SPI rules).
16. In the case that an application server later sends a HTTP redirect request, the gateway may or may not allow this depending on the gateway configuration, e.g. as related to an Offer-Id.

In the second scenario, new bundles are introduced and an already deployed or instantiated gateway is to be updated. In some examples of this scenario, when a new offer is activated in the home network, this triggers a service request to LCM with an Offer-Id as one of the parameters. This information is triggered towards the LCM and the relevant Offer-id is provided so that a correct gateway configuration module for the gateway in the slice or visited network is chosen. This Offer-Id is chosen e.g. by BSS to reflect the selection criteria outlined above. Based on the Offer-Id, for example, the LCM chooses the correct configuration module and that configuration is implemented in the gateway.

Figure 4:
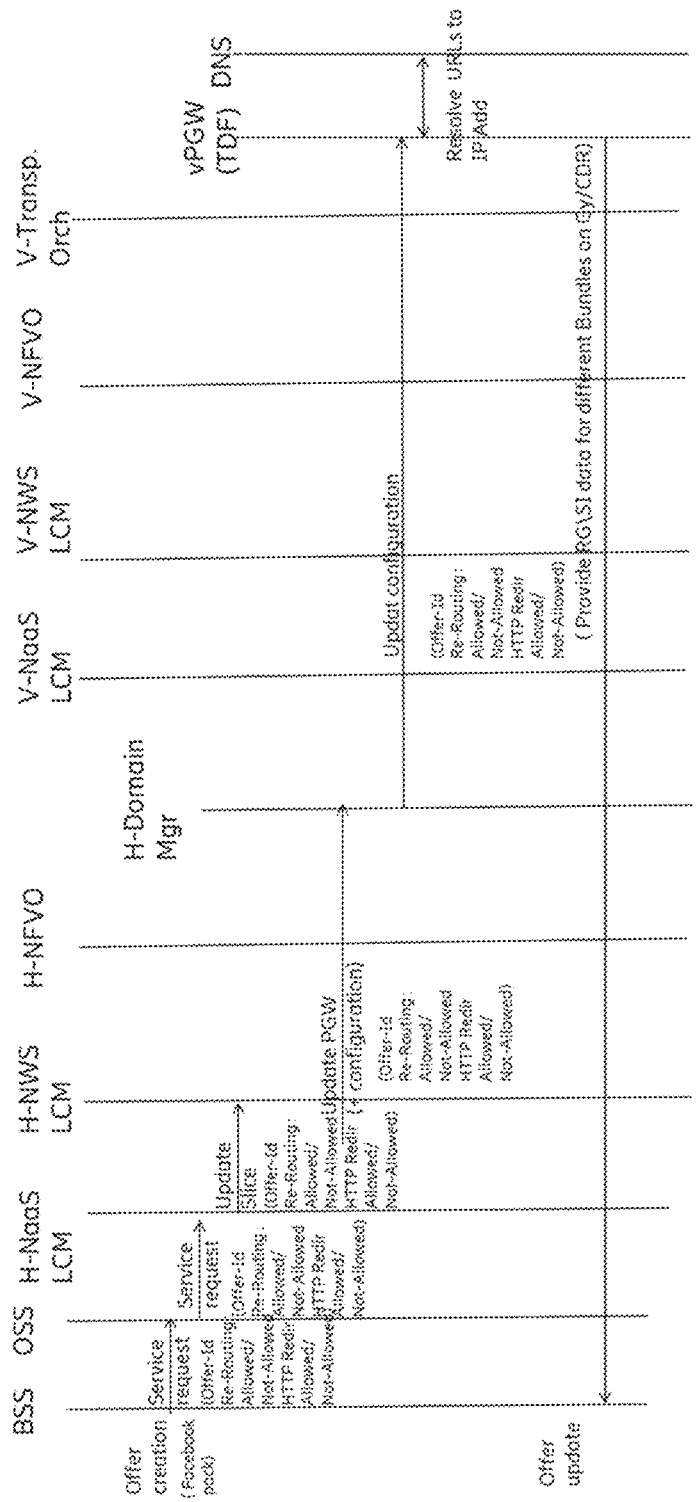
FIG. 4 shows an example of a call flow in a scenario where new bundles are introduced and an already deployed or instantiated gateway is to be updated.

FIG. 4 shows an example of a call flow 400 in this scenario, where new bundles are introduced and an already deployed or instantiated gateway is to be updated. Steps of the call flow this example scenario are described in more detail below.

1. A BSS requests a NaaS (direct contact to NaaS LCM or via OSS for existing network slice services already running in the network) based on a service e.g. offer or bundle. This may be for example an "offer" available in the service catalogue and made orderable. The customer may provide some input and/or customer specific data needed during the instantiation (e.g. region of service, number of end user devices, capacity demand). This may also include at least one Offer-Id as one of the features to identify the correct configuration module for the slice or visited network gateway.
2. Based on the definition of the requested offer, the NaaS governance maps this to network slice(s). As an example, the offer may say that a new service configuration shall be instantiated in existing network slice. It may also specify some of the input parameters required at the network slice governance layer (e.g. defined by a blueprint) or how to derive these parameters e.g. based on customer data, service level agreement (SLA) data etc.
3. A request is sent downwards to the network slice LCM (Life Cycle Manager) (e.g. H-NWS LCM) to modify a slice, pointing at a named blueprint and providing the required input parameters specific to the gateway in the slice. This includes at least one Offer-Id as one of the features to identify the correct configuration module for the gateway.
4. The network slice LCM (H-NWS LCM) parses the blueprint and executes a workflow for updating configuration of the network slice. Resource needs are determined, e.g. based on blueprint and inputs, such as "size" of network functions instances, and a configuration is generated for each VNF (e.g. virtualized PGW) based on blueprint, input parameters and back-end services (some properties may need to be assigned and/or unique, such as IP addresses or certain identifiers).
5. The network slice LCM may interact directly with VNFs and/or intra-slice management functions, or send an update configuration to a network domain manager for the VNF (e.g. virtualized PGW), to fully configure the network slice. Based on the Offer-Id and selection criteria, the correct configuration module for the gateway is chosen. This includes the Offer specific configuration.
6. A list of URIs or URLs is provided to the gateway as part of the Offer-Id configuration. The gateway then retrieves the local IPs (e.g. local to the visited network) using an External Service Discovery Function such as e.g. a DNS look-up on these URIs or URLs. Thus, for each federated slice, the same list of URLs may result in different IP addresses for configuration rules (e.g. SPI rules).
7. In the case that an application server later sends a HTTP redirect request, the gateway may or may not allow this depending on the gateway configuration, e.g. as related to an Offer-Id.

In some examples, gateway configuration can include an additional flag to allow or disallow a traffic routing request from an application function (AF). As the gateway is deployed in a visited network, it may get the traffic routing request from an AF in the visited network or in the country of the visited network. To avoid any routing of traffic in such cases, the gateway can be instantiated with a configuration to allow or disallow such requests (e.g. universally or for specific services).

Figure 5:
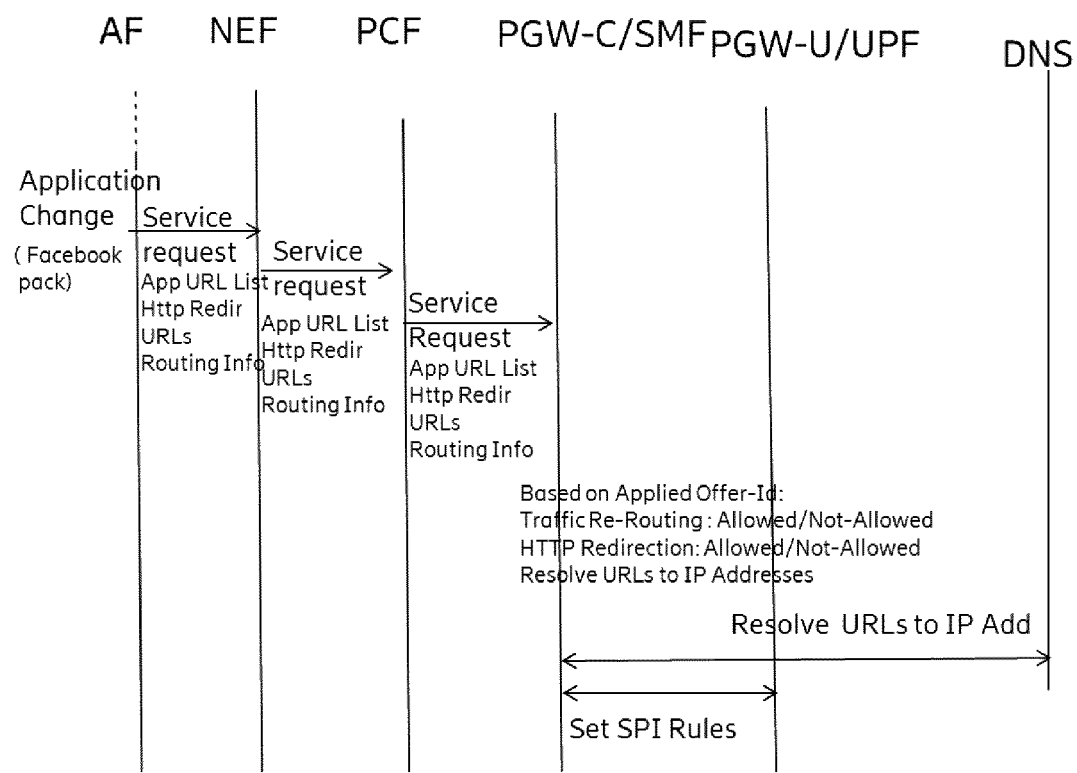
FIG. 5 shows an example of a call flow where an AF may change the traffic routing information in a gateway.

FIG. 5 shows an example of a call flow 500 where an AF may change the traffic routing information in the gateway. The AF can for example interact with a policy control and charging function (PCF) directly (e.g. for a trusted AF) or via other entities such as Network Exposure Function (NEF). This shows an example of a flow where AF provides application related information to the gateway. The AF can in some examples interact with the PCF directly or via the other entities like a Network Exposure Function (NEF). Here, traffic is routed to some other PDN. The additional flag provides control over the gateway in a slice (e.g. federated slice) so that offers and/or bundles cannot be modified by the local AF. Steps of the call flow this example scenario are described in more detail below.

1. The gateway is already instantiated and configured, for example as described above.
2. The AF provides application related information to the network functions. This is based for example on an agreement between an OTT service provider, the visited network and the home network. This information may include following details: application URIs or URLs; application URIs or URLs for HTTP redirection; and a traffic rerouting requirement indication.
3. A request is sent downwards to the NEF, which relays this request to PCF which provides it to the PGW/SMF where a subscriber session is created.
4. The gateway based on its configuration of Offer-Id(s) decides if It needs to resolve these URLs to IP addresses e.g. for SPI rules; if HTTP redirection is allowed for these URLs, and may resolve the redirection URLs to add to the SPI rules; and if traffic rerouting is allowed for this Application.
5. The gateway then retrieves the local IPs (e.g. local to the visited network) using an External Service Discovery Function such as for example a DNS look-up on these URIs or URLs. Thus, for each slice, the same list of URLs may result in different IP addresses e.g. for SPI rules.
6. The gateway implements the SPI rules. Depending on the network configuration, these rules may in some examples be provided to UPF or PGW-U.

Figure 6:
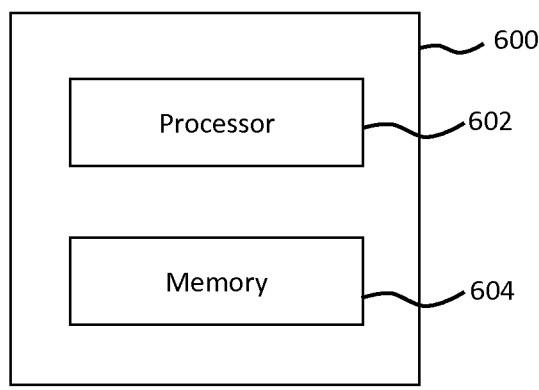
FIG. 6 shows an example of apparatus in a network.

FIG. 6 shows an example of apparatus 600 in a network, wherein the network is a visited network for at least one User Equipment, UE. The network provides a network slice for the at least one UE, and the apparatus 600 implements a gateway for data communications for the at least one UE. The apparatus 600 comprises a processor 602 and a memory 604. The memory 604 contains instructions executable by the processor 602 such that the apparatus 600 is operable to obtain an IP address for at least one service for the at least one UE, and provide the at least one service to the at least one UE according to a gateway configuration from a home network of the at least one UE.

Figure 7:
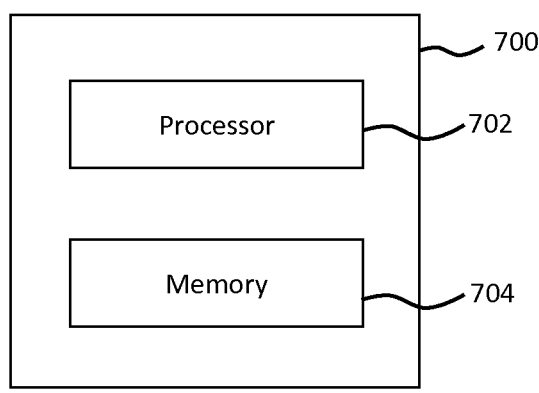
FIG. 7 shows an example of apparatus in a network.

FIG. 7 shows an example of apparatus 700 in a home network for at least one User Equipment, UE. The apparatus 700 comprises a processor 702 and a memory 704. The memory 704 contains instructions executable by the processor 702 such that the apparatus 700 is operable to instantiate a network slice for the at least one UE in a visited network for the at least one UE, and provide a gateway configuration for the network slice to the visited network, the gateway configuration for configuring a network function in the visited network to provide at least one service to the at least one UE.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a network function in a network, the network being a visited network for at least one User Equipment, UE, the network providing a network slice for the at least one UE, and the network function is a gateway for data communications for the at least one UE, the method comprising:
    obtaining an IP address for at least one service for the at least one UE; and
    providing the at least one service to the at least one UE according to a gateway configuration from a home network of the at least one UE.

2. The method of claim 1, wherein providing the at least one service to the at least one UE comprises processing data communications for the at least one UE according to the gateway configuration.

3. The method of claim 1, wherein the gateway configuration comprises at least one of:
    at least one of: at least one billing rule, at least one data access rule, and at least one Shallow Packet Inspection (SPI) rule for at least one of the at least one service and for the at least one UE;
    at least one rule associated with the at least one UE; and
    at least one rule associated with the at least one service.

4. The method of claim 1, wherein the at least one service is identified in the gateway configuration by one or more Uniform Resource Identifiers (URIs) and wherein obtaining the IP address for the at least one service comprises performing a Domain Name System (DNS) query using the one or more URIs.

5. The method of claim 1, wherein the network function is comprised in the network slice.

6. The method of claim 1, comprising one or both of receiving the gateway configuration from the home network and receiving the gateway configuration in response to instantiation of the network slice.

7. The method of claim 1, wherein providing the at least one service to the at least one UE comprises selectively allowing a HTTP redirect request for the at least one service based on the gateway configuration.

8. The method of claim 1, wherein the gateway configuration is specific to the visited network.

9. The method of claim 1, comprising receiving an update to the gateway configuration, wherein the update to the gateway configuration identifies one or both of the at least one service and at least one further service.

10. A method in a home network for at least one User Equipment, UE, the method comprising:
    instantiating a network slice for the at least one UE in a visited network for the at least one UE; and
    providing a gateway configuration for the network slice to the visited network, the gateway configuration for configuring a network function in the visited network to provide at least one service to the at least one UE, the gateway configuration indicating whether to allow an Hypertext Transfer Protocol, HTTP, redirect request for one or both of the at least one service and the at least one UE.

11. The method of claim 10, wherein the gateway configuration is to configure the network function to process data communications for the at least one UE according to the gateway configuration.

12. The method of claim 10, wherein the gateway configuration comprises at least one of:
    at least one of: at least one billing rule, at least one data access rule, and at least one Shallow Packet Inspection (SPI) rule for at least one of the at least one service and for the at least one UE;
    at least one rule associated with the at least one UE; and
    at least one rule associated with the at least one service.

13. The method of claim 10, wherein the gateway configuration is at least one of:
    specific to the visited network; and
    based on at least one of the visited network and a country of the visited network.

14. The method of claim 10, comprising sending an update to the gateway configuration to the visited network, wherein the update to the gateway configuration identifies at least one of the at least one service and at least one further service.

15. An apparatus in a network, the network being a visited network for at least one User Equipment, UE, the network providing a network slice for the at least one UE, and the apparatus implementing a gateway for data communications for the at least one UE, the apparatus comprising a processor and a memory, the memory containing instructions executable by the processor such that the apparatus is configured to:
    obtain an IP address for at least one service for the at least one UE; and
    provide the at least one service to the at least one UE according to a gateway configuration from a home network of the at least one UE.

16. The apparatus of claim 15, wherein providing the at least one service to the at least one UE comprises processing data communications for the at least one UE according to the gateway configuration.

17. An apparatus in a home network for at least one User Equipment, UE, the apparatus comprising a processor and a memory, the memory containing instructions executable by the processor such that the apparatus is configured to:
    instantiate a network slice for the at least one UE in a visited network for the at least one UE; and
    provide a gateway configuration for the network slice to the visited network, the gateway configuration for configuring a network function in the visited network to provide at least one service to the at least one UE, the gateway configuration indicating whether to allow an Hypertext Transfer Protocol, HTTP, redirect request for one or both of the at least one service and the at least one UE.

18. The apparatus of claim 17, wherein the gateway configuration is to configure the network function to process data communications for the at least one UE according to the gateway configuration.

19. A non-transitory computer storage medium storing a computer program comprising instructions which, when executed on at least one processor, cause the at least one processor to carry out a method in a network function in a network, the network being a visited network for at least one User Equipment (UE) the network providing a network slice for the at least one UE, and the network function is a gateway for data communications for the at least one UE, the method comprising:
- obtaining an IP address for at least one service for the at least one UE; and
- providing the at least one service to the at least one UE according to a gateway configuration from a home network of the at least one UE.

* * * * *